United States Patent [19]

Schuhmacher

[11] 4,373,924
[45] Feb. 15, 1983

[54] TORQUE LIMITING CLUTCH

[75] Inventor: Ernst Schuhmacher, Bad Homburg, Fed. Rep. of Germany

[73] Assignee: Deere & Company, Moline, Ill.

[21] Appl. No.: 164,870

[22] Filed: Jul. 1, 1980

[30] Foreign Application Priority Data

Aug. 4, 1979 [DE] Fed. Rep. of Germany ....... 2931732

[51] Int. Cl.³ .............................................. F16D 19/00
[52] U.S. Cl. .................................... 464/38; 192/56 R
[58] Field of Search ............ 64/28 R, 29, 30 C, 30 D;
192/56 R

[56] References Cited

U.S. PATENT DOCUMENTS

| 2,291,407 | 7/1942 | Paul | 64/29 |
| 2,375,020 | 5/1945 | Mitchell | 64/29 |
| 2,561,136 | 7/1951 | Richardson | 64/29 |
| 2,643,530 | 6/1953 | Lathrop | 64/29 |
| 3,063,263 | 11/1962 | Bobst et al. | 64/29 |
| 3,167,936 | 2/1965 | Engquist | 64/29 |

FOREIGN PATENT DOCUMENTS 2736329  2/1979  Fed. Rep. of Germany .......... 64/29

Primary Examiner—Ira S. Lazarus

[57] ABSTRACT

A rotary transmission assembly for mounting on a shaft includes a slip clutch for limiting the torque which may be transmitted between a chain sprocket forming part of the transmission assembly and the shaft. The sprocket is rotatably mounted on a hub which may be keyed to the shaft. Adjacent and approximately co-planar radial faces of hub and sprocket both include serrated clutching surfaces. Torque transmission between shaft and sprocket is completed by an annular connecting clutch element having a face including concentric inner and outer annular clutching surfaces having sets of serrations for mating respectively with the clutching surfaces of the hub and sprocket. A compression spring holds the serrations in engagement in normal operation. When a predetermined torque is exceeded, the clutching surfaces separate axially until relative rotation can take place between the sprocket and hub.

9 Claims, 2 Drawing Figures

TORQUE LIMITING CLUTCH

BACKGROUND OF THE INVENTION

The present invention relates to a rotary power transmission arrangement of the type which permits relative rotary motion between an input and an output element when a given level of torque is exceeded.

Torque limiting clutches, often called slip clutches, are commonly used as overload protection devices to prevent damage to members of a drive train when an output member is overloaded. They find wide application in agricultural machine drives, such as those of combine harvesters, where wide variations in rate of feeding and condition of crop material must be tolerated and overloading, including plugging resulting in the arresting of the motion of a crop engaging element, such as a conveyor, sometimes occurs. Without limiting the scope of the invention, it is convenient to discuss the field in terms of a particular application, such as power transmission between a shaft and a tangentially loaded element, such as a chain sprocket, spur gear or V-belt sheave concentric with it.

In a common form of conventional clutch, the so-called jump clutch, the connecting clutch elements are a pair of opposed serrated annular rings concentric with the shaft, one engaging the sprocket for rotation with it, the sprocket otherwise being free to rotate relative to the shaft, while the other ring is coupled to the shaft for rotation with it by means of a keyway or spline. The coupling of the sprocket to the shaft is maintained by an axial bias, typically by a compression spring holding the annular rings in engagement, and slipping of the clutch occurs only when the torque transmitted is sufficient to overcome the friction or torsional resistance derived from the mating serrations of the opposing clutch rings.

Slipping of the clutch clearly depends therefore on relative axial movement between components and the most common arrangement has been for the clutch half coupled to the shaft to remain axially fixed while the other half, drivingly connected to the sprocket, is displaced axially to permit relative rotational movement. The disadvantage of this arrangement is that with, for example chain drives of short center distance, the chain and sprocket are subject to misalignment and severe vibration while under heavy load tending to shorten the life of chain and sprocket severely. The alternative, accommodating the required axial displacement in the coupling of the other clutch half to the shaft, requires a relatively costly and sophisticated design permitting sliding (axial displacement) between surfaces under extreme torsional load.

SUMMARY OF THE INVENTION

Accordingly, it is an object of the invention to provide a slip clutch, especially of the jump clutch type, which requires neither that a tangentially loaded and connected element such as a chain sprocket, is subject to axial displacement when the clutch slips under an overload condition or that there is axial displacement between the drive shaft and that portion of the clutch non-rotatably connected to the shaft.

According to the invention, rotary motion may be transmitted through a rotary transmission assembly, including a slip clutch effective between first and second transmission members, by a connecting loop or clutch element permitting relative rotary motion between the two transmission members only when a predetermined torque level is reached, causing disengagement of the clutch element from either one or both of the transmission members. It is a feature of the invention that the clutch element may have a clutching surface engaging mating clutching surfaces on each of the transmission members, the opposing or interfaced clutching surfaces being held in engagement by axial bias means. The clutch element may be regarded as a connecting loop between the first and second transmission members, the engagement of the respective clutching surfaces normally preventing relative rotation between the members. Torque transmission at the interfaces tends to separate the clutch element axially from the transmission members and the clutching surfaces may be designed to disengage approximately simultaneously or, selectively, with release occurring first at either one of the interfaces, first transmission member to clutch element or second transmission member to clutch element.

In keeping with the invention, the mating clutching surfaces may be approximately radially extending and include radially oriented serrations, so that axially biasing the clutch element into engagement with the clutching surfaces of the transmission members creates a self-centering force, which in normal operation, with the clutch engaged, maintains the clutch element in a concentric position relative to the axis of the rotary transmission members.

The transmission members may be arranged so that their respective clutching surfaces present concentric annular clutching surfaces to the clutch element, and the clutching surfaces of the clutch element may include concentric distinct annular radially inner and outer clutching surfaces for mating with those of the transmission members. The clutching surfaces may be integral with the transmission members or clutch element or they may be part of annular members, provided with raised portions on their sides opposite the clutching surfaces to be received in corresponding recesses in the transmission members or clutch element for locating and driving the annular clutch members.

In a preferred embodiment of the invention, the first transmission member may be in the form of a hub adapted to be carried concentrically and non-rotatably on a drive shaft and having the second transmission member journaled concentrically on it. The clutch element may have a central clearance hole providing clearance with respect to the first transmission member such that with the clutch engaged, the clutch element is located by the self-centering effect of the clutching surfaces and makes no direct contact with the first transmission member. The hole may be sized to provide a convenient stop or limit to the degree of eccentricity between the clutch element and the transmission members which may occur when the clutch slips. In this embodiment, the biasing of the clutch elements together may be provided by a concentric compression spring retained on the hub-like first transmission member by adjustable means so that the transmission members, clutch element, spring means and retaining means constitute a self-contained torque limited rotary transmission assembly which may be assembled as a unit to a drive shaft with its torque limit selectively preset.

An advantage of the invention is that under maximum applied torque conditions, only the clutch element (connecting loop) is axially displaced with respect to the transmission members. There is no need for a transmission member, such as a sprocket or gear, to be axially displaced while under load nor for there to be relative axial sliding motion between a transmission member and a mating part under load while the clutch is slipping. These features, coupled with the fact that the clutch element may be a relatively light member, make for more efficient design, in weight and size of members and of bearing capacity, for transmission of a given power level. Separation of the clutching surfaces of the clutch element into annular concentric inner and outer portions makes for simpler and lower cost of manufacture, especially if the clutching surfaces comprise radially oriented serrations.

DESCRIPTION OF THE PREFERRED EMBODIMENT

Figure 1:
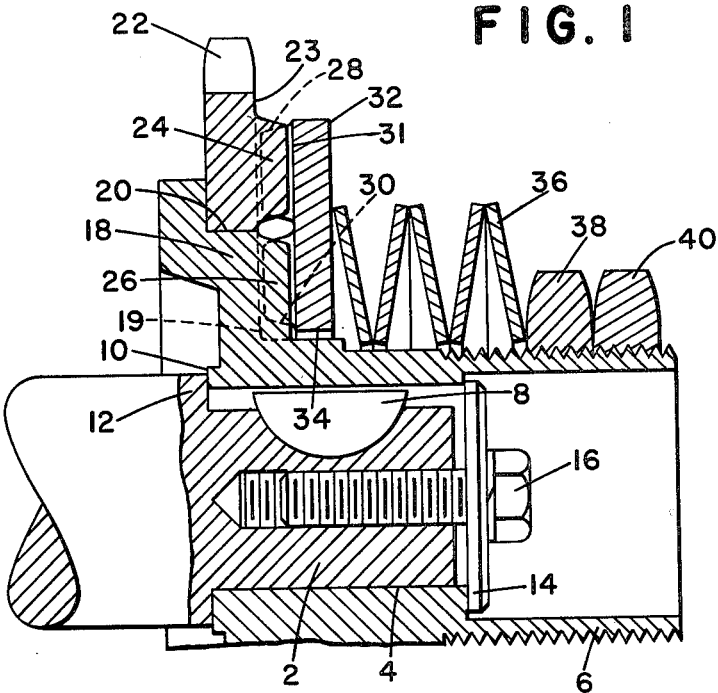
FIG. 1 is a semi-schematic, cross-sectional partial view of a rotary transmission assembly embodying the invention in the form of a self-contained assembly keyed to a drive shaft.

FIG. 1 shows semi-schematically an embodiment of the invention in which a torque limited transmission assembly is carried on a drive shaft as a self-contained preassembled preset unit.

On a shaft 2, a hub 6 provided with a bore 4 is arranged non-rotatably by means of a key 8. The end face 10 of the hub 6 bears against a shoulder 12 on the shaft 2 and is axially secured by means of a washer 14 and a cap screw 16. The hub 6 has an annular flange 18 including a radially extending clutch face 19 and a bearing portion 20 on which a chain sprocket 22 is rotatably mounted. The sprocket 22 may be in the form of a drive wheel or a driven wheel. Instead of the sprocket 22, it is also possible to provide a V-belt pulley, spur gear or other drive means. The sprocket 22 has a clutch face 23 including a clutching surface 24 which may, for example, be in the form of the well known sawtooth-shaped projections or serrations. An inner concentric clutching surface 26 is provided on the clutch face 19 of the annular flange 18 of the hub 6. The clutching surfaces 24 and 26 are operatively connected to or interface with mating clutching surfaces 28 and 30 which are arranged on the clutch face 31 of an annular clutch element or connecting loop 32. The clutching surfaces 28 and 30 may be of integral construction and may extend continuously radially or comprise radially separated concentric annular portions as shown. The clutch element 32 is provided with a bore 34 which is of such a size that the element 32 is radially displaceable relative to the hub 6 so as to permit self-centering of the flange 32 by way of the serrations of the clutching surfaces 24, 26, 28 and 30. Spring members, such as Belleville washers 36, which are secured by means of two nuts 38 and 40, bear against the outer face of the clutch element 32. The springs 36 in this arrangement are threaded concentrically over the hub 6 and cause axial bias of the element 32 so that the clutching surfaces 24, 26, 28 and 30 can be brought into and remain in operative connection or engagement with each other.

As the sprocket 22 is carried on the annular flange 18 and the clutch element 32, the springs 36 and the nuts 38 and 40 are jointly disposed on the hub 6, the torque limited rotary transmission assembly can be pre-assembled and adjusted and fitted onto the shaft 2 as a unit and retained by the washer 14 and cap screw 16.

Figure 2:
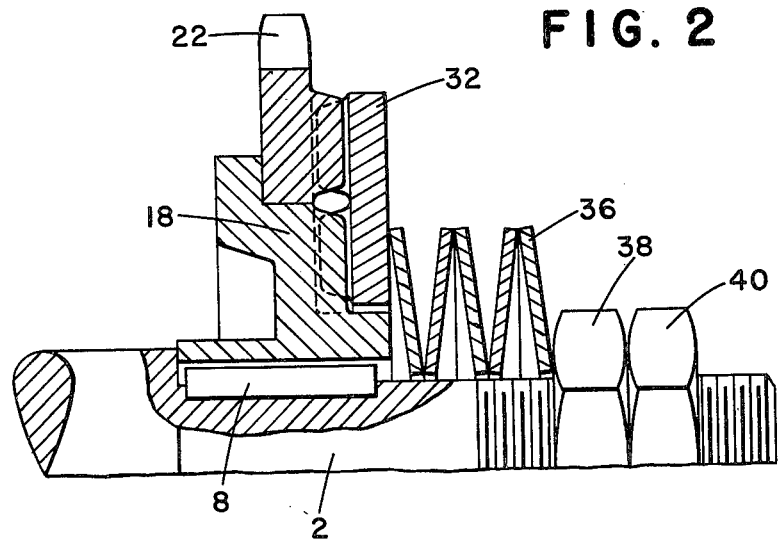
FIG. 2 is a view similar to FIG. 1 of an alternate embodiment of the invention in which the components are assembled individually to a drive shaft.

In accordance with a further embodiment, as shown in FIG. 2, it is also possible for the spring members 36 to be arranged directly on the shaft 2. In addition, the clutch element 32 and the nuts 38 and 40 can also be mounted directly on the shaft 2. In this way, the screw indicated at 16 in FIG. 1 and the washer 14 can be omitted. This therefore results in an even less expensive design.

Torque transmission is normally by way of the sprocket 22, the clutching surfaces 24 and 28, the clutch element 32 and the clutching surfaces 26 and 30 to the hub 6 and thus to shaft 2 through the key 8. If, in operation, excessive torque occurs, the clutch element 32 is axially displaced against the force of the springs 36 and thereby disengages the operative connection between the clutching surfaces 24 to 30. As now the sprocket 22 is not fixedly connected to the hub 6, it may rotate relative to the hub 6, in the disengaged condition of the clutch. The sprocket 22 does not need to be displaced in the axial direction so that it is always in the same plane as the associated drive means (chain and another sprocket, for example). With this arrangement, it is also possible for the shaft 2 to be driven, in which case power transmission is in the opposite direction.

I claim:

1. A rotary transmission assembly including a torque limiting slip clutch comprising:
    a first transmission member having an at least partially radially extending clutch face including a clutching surface;
    a second transmission member supported by and rotatable relative to the first transmission member and including an at least partially radially extending clutch face including a clutching surface disposed radially outward of and of substantially the same clutching characteristics as the clutching surface of the first transmission member;
    a clutch element having a clutch face facing the respective clutch faces of the first and second transmission members and including a clutching surface having inner and outer portions for mating respectively with the clutching surfaces of the first and second transmission members said mating including axially overlapping engagement of the respective surfaces; and
    means for biasing the clutch element axially so that the respective clutching surfaces engage for transmitting torque between the first and second transmission members by way of the clutch element, the nature of the clutching surfaces being such that said torque transmission results in an axial separating force tending to axially separate and disengage the clutching surfaces of the clutch element from those of the transmission members and deflectably resisted by the bias means and so that, at a predetermined torque, the separation is such that at least one of the mating pairs of clutching surfaces disengage, permitting relative rotational movement between the first and second transmission elements.

2. The transmission assembly of claim 1 wherein the clutching surfaces comprise sets of radially extending serrations such that upon entering into engagement, mating clutching surfaces tend to be mutually self-centering so that the maintenance of the disposition of the clutch element with respect to the first transmission member is essentially dependent on said self-centering.

3. The transmission assembly of claim 1 wherein the inner and outer portions of the clutching surface of the clutch element comprises respectively, concentric radially spaced inner and outer annular rings.

4. The transmission assembly of claim 1 wherein the clutching surfaces of the first and second transmission members are respectively integral with the clutch faces of those members.

5. The transmission assembly of claim 1 wherein the first transmission member comprises a hub for being carried concentrically on a drive shaft and the second transmission member is journaled concentrically on the first.

6. The transmission assembly of claim 5 wherein the first transmission member includes an at least partially cylindrical axially extending hub portion and wherein the clutch element includes a central clearance hole so that in normal operation with the clutch engaged, the clutch element does not contact the hub portion.

7. The transmission assembly of claim 6 wherein the bias means comprises compression spring means concentrically disposed with respect to the hub portion of the first transmission member and further including retaining means adjustably connected to the hub portion for retaining the second transmission member, clutch element and compression spring means on the first transmission member so as to constitute a self-contained adjustable slip clutch assembly.

8. The transmission assembly of claim 1 wherein the inner and outer portions of the clutching surface of the clutch element each have raised portions having crests, said crests defining planes of disengagement, and wherein the respective planes substantially coincide.

9. The transmission assembly of claim 1 wherein the respective axial separations required for disengagement between the clutch element and the respective clutching surfaces are substantially equal so that the disengagements of the respective surfaces occur approximately simultaneously.

* * * * *